US006824594B2

(12) United States Patent
Larsson

(10) Patent No.: US 6,824,594 B2
(45) Date of Patent: Nov. 30, 2004

(54) MODULAR AIR SUPPLY

(75) Inventor: Sven-Olof Larsson, Landskrona (SE)

(73) Assignee: Halder Brake Products AB (SE)

( * ) Notice: Subject to any disclaimer, the term of this patent is extended or adjusted under 35 U.S.C. 154(b) by 0 days.

(21) Appl. No.: 10/629,126

(22) Filed: Jul. 29, 2003

(65) Prior Publication Data

US 2004/0083893 A1 May 6, 2004

Related U.S. Application Data

(63) Continuation of application No. PCT/SE02/00143, filed on Jan. 29, 2002.

(30) Foreign Application Priority Data

Jan. 29, 2001 (SE) .............................................. 0100238

(51) Int. Cl.$^7$ .......................... B01D 53/04; B01D 53/26
(52) U.S. Cl. ............................. 96/109; 96/142; 96/147
(58) Field of Search ................. 96/108–117, 134–136, 96/142, 147, 153

(56) References Cited

U.S. PATENT DOCUMENTS

| | | | | |
|---|---|---|---|---|
| 2,569,537 A | * | 10/1951 | Robbins | 454/255 |
| 3,258,899 A | * | 7/1966 | Coffin | 96/114 |
| 3,323,291 A | * | 6/1967 | Kern | 96/111 |
| 3,543,482 A | * | 12/1970 | Foster | 96/111 |
| 3,552,096 A | * | 1/1971 | Dayson | 96/114 |
| 4,584,001 A | * | 4/1986 | Dechene | 96/114 |
| 4,892,569 A | * | 1/1990 | Kojima | 96/113 |
| 5,171,336 A | * | 12/1992 | Shulick | 96/115 |
| 5,209,764 A | * | 5/1993 | Eberling | 96/114 |
| 5,334,230 A | * | 8/1994 | Sloka | 96/113 |
| 5,522,150 A | * | 6/1996 | Schultz | 34/80 |
| 5,531,807 A | * | 7/1996 | McCombs | 95/26 |
| 5,575,541 A | * | 11/1996 | Elamin | 303/1 |
| 5,662,727 A | * | 9/1997 | Castle et al. | 96/115 |
| 5,785,742 A | * | 7/1998 | Mitsch | 96/144 |
| 5,917,139 A | * | 6/1999 | Goodell et al. | 96/113 |
| 5,961,698 A | * | 10/1999 | Dossaji et al. | 96/130 |
| 6,074,462 A | * | 6/2000 | Quinn et al. | 96/113 |
| 6,179,903 B1 | * | 1/2001 | Muller | 96/55 |
| 6,200,365 B1 | * | 3/2001 | Eimer et al. | 95/19 |
| 2002/0189456 A1 | * | 12/2002 | Hoffman et al. | 96/110 |

FOREIGN PATENT DOCUMENTS

| | | |
|---|---|---|
| DE | 35 14 989 A1 | 10/1986 |
| DE | 195 38 339 A1 | 4/1997 |
| DE | 197 15 528 A1 | 11/1997 |
| EP | 0530019 A2 * | 3/1993 |
| EP | 0 976 636 A2 | 2/2000 |
| WO | WO 95/2983 A1 | 11/1995 |

* cited by examiner

Primary Examiner—Robert H. Spitzer
(74) Attorney, Agent, or Firm—St. Onge Steward Johnston & Reens LLC

(57) ABSTRACT

The present invention concerns a modular air supply system for a vehicle, normally a truck or bus. The system comprises a base unit forming an interface to different modules of the air supply system. Such further modules may include an air treatment module, an electronic drier unit and air distribution module.

14 Claims, 2 Drawing Sheets

MODULAR AIR SUPPLY

This application is a continuation of pending International Patent Application No. PCT/SE02/00143 filed Jan. 29, 2002, which designates the United States and claims priority of pending Swedish Application No. 0100238-5 filed Jan. 29, 2001.

FIELD OF THE INVENTION

The present invention concerns a modular air supply system, in which a number of air treatment and air distribution modules are arranged in connection with a base unit.

BACKGROUND OF THE INVENTION

A compressed air system for a vehicle, normally a truck or bus, usually includes a number of components having different functions. The components include components to clean and dry the air, and to distribute the compressed air to different functions, such as brakes, steering, suspensions and door openers. The compressed air system also includes a compressor and one or more reservoirs for the compressed air.

The modular air supply system of the present invention concerns only a part of the total system of compressed air for a vehicle, such as a heavy or light duty truck, lorry or bus.

As the air compressor systems have developed over the years and the demands on efficiency have increased the systems have become more and more extensive. Before the air from the air compressor reaches the rest of the air pressure system and the air pressure tanks, it is dried in an air drier, which normally is an air dryer of desiccant type. The desiccant of the air dryer is frequently regenerated by dry air to maintain good performance of the air dryer. Furthermore, the air pressure in the tank(s) is monitored and when a lower set limit is reached the compressor is started to load the air tanks. When a higher set limit of the air pressure of the tanks is reached an unloading valve will open and expand the air pressure to the atmosphere.

By monitoring the air deliveries from the compressor through the dryer and by calculating the need for regeneration continuously, on the road, the air dryer process will be close to optimal for the present technology, using desiccants for drying of the air. Furthermore, by measuring ambient temperature and system pressure, the air-drying process will adapt to any application and vehicle operation. Depending on driving conditions, the system can make a choice when the regeneration process is to take place.

To control the regeneration of the air dryer, the pressure of the air tanks and the distribution of compressed air to the different functions of the vehicle a number of electronic, pneumatic and/or mechanic controls are needed. These controls and the air dryer are the main parts of the modular air supply system of the present invention.

Depending on different types and sizes of vehicles, regulations in different countries, demands from owners and drivers, different climates etc. the air supply system will have different parts and functions. This means that suppliers of air systems normally will have to have systems of different sizes and design giving many different variants. Thus, there is a need for a more flexible air supply system, which is more easily adapted to different vehicles and reduces the demands regarding different variants.

One main object for an owner of a commercial vehicle is that the vehicle should spend as little time on maintenance as possible. The air supply systems of prior art are often rather complex having many integrated parts, which is not optimal regarding maintenance and repair. Thus there is a need for an air supply system which facilitates maintenance and repair. There is also a need for an air supply system giving advantages of production.

SUMMARY OF THE INVENTION

The present invention is based on the idea of using a base unit, which is furnished with different modules depending on needs, wishes and regulations. Thus, the system is designed for high modularity built around a base unit, which may be fitted with different modules and functions.

One object of the present invention is to facilitate maintenance and service of the compressed air system and thus, make it possible to decrease the time of service for the vehicle.

A further object of the present invention is to make the system more compact and flexible but still reliable. A more compact and flexible air pressure system is easier to adapt to different demands, reducing the demands on storage.

The above objects are met by a modular air supply system for a vehicle, which system comprises a base unit forming an interface to different modules of the air supply system.

Further objects and advantages of the present invention will be obvious for a person skilled in the art from reading the description below of preferred embodiments of the invention.

BRIEF DESCRIPTION OF THE DRAWINGS

In the enclosed FIGS. one embodiment of the invention is shown in way of an example.

DETAILED DESCRIPTION OF PREFERRED EMBODIMENTS

Figure 1:
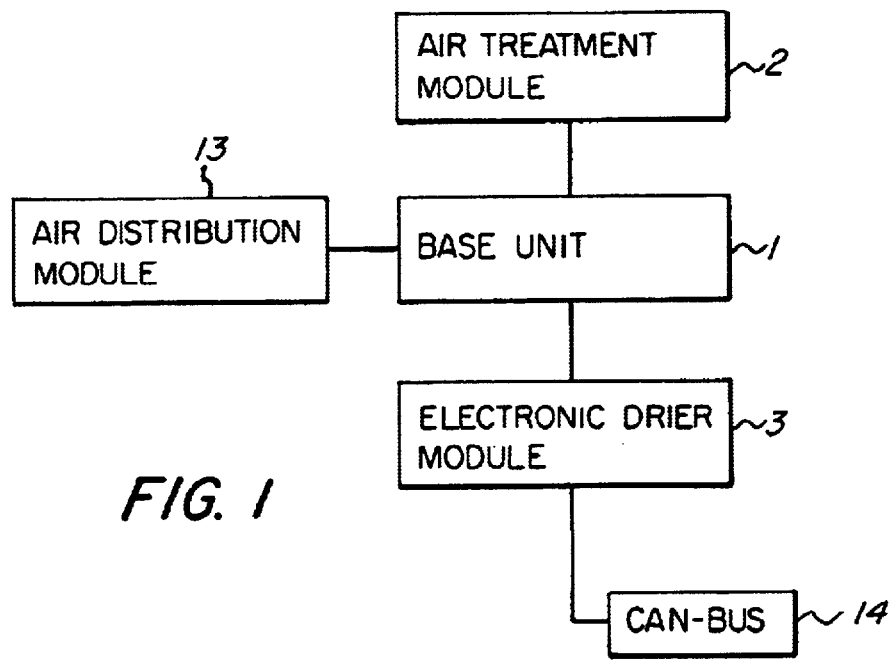
FIG. 1 shows a block diagram for a modular air supply system according to the present invention.
Figure 2:
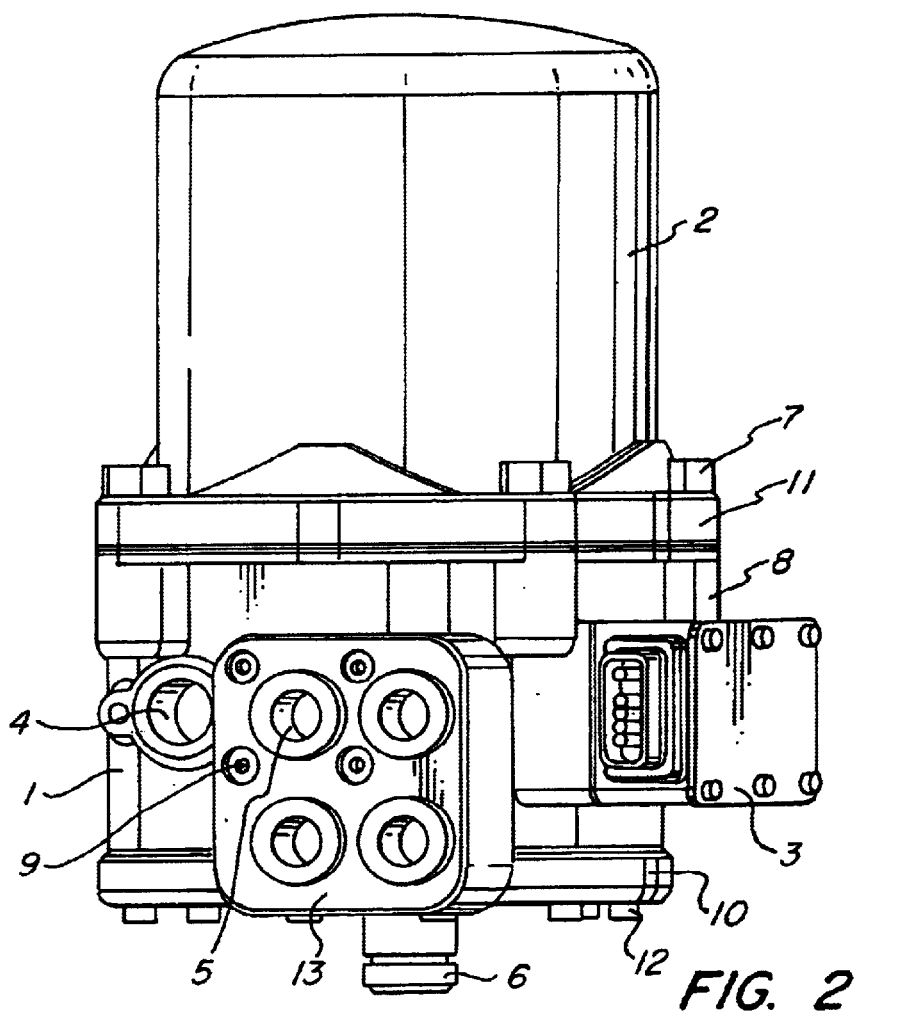
FIG. 2 shows an example of the modular air supply system in side elevation.

The modular air supply system according to the embodiment shown in the drawings, include a base unit 1, an air treatment module 2, an electronic drier module 3 and an air distribution module 13 (not shown in FIG. 2). In other embodiments (not shown) the electronic drier module 3 is replaced by a mechanical drier module. The air treatment and electronic drier modules 2,3 are normally fixed to the base unit 1. The air distribution module 13 may also be fixed to the base unit 1, but in the embodiment of FIG. 2 it is arranged in a remote position. Furthermore, the compressed air system includes a compressor, one or more reservoirs normally in form of accumulators and different users, such as brakes, steering and suspensions. But as the invention is directed to the base unit 1 and the modules 2, 3, 13 directly in connection with it, these parts will not be described further here.

In this description the terms "upper", "lower" and similar expressions refer to the directions when the modular air supply system is placed as shown in FIG. 2.

One purpose of the invention is that the same base unit 1 should be possible to use in many different applications. Furthermore, it should be easy to reach and possibly exchange parts that need service or to be exchanged from time to time. It is possible to adapt the base unit 1 to many different modules having different functions.

The base unit 1 has at least one check valve, one unloading valve, one air inlet 4, one air outlet 5 and an exhaust 6. Furthermore, the base unit 1 has a number of recesses (not shown) for receiving the above valves and possible optional valves and other optional equipment. The base unit 1 also has a number of channels for the compressed air and channels used for the control of the valves and possible other equipment. The optional further valves may include a safety valve; further check valves, a turbo protection valve and a depot valve. The optional equipment may be a silencer and/or a heater. In the shown embodiment a bottom plate 10 is fixed to the bottom of the base unit 1 for easy access to different parts received in the base unit 1 or for cover of not used recesses of the base unit 1. Furthermore, the bottom plate 10 normally comprises channels for leading of the compressed air to and from the different units of the base unit 1. It is envisaged that the base unit 1 normally will have no bottom plate 10. Thus, the base unit 1 will be produced in one piece.

The safety valve is to protect the modular air system against high air pressure and will only operate in case of failure mode. The check valve of the base unit 1 is to prevent air to flow from the system tanks to atmosphere during off-loading conditions. A governor of the base unit 1 controls the air in the system to be between specified cut-in and cut-out pressures. A compressor control controls the air compressor with a pneumatic signal, pressurised for off loading phase and non-pressurised for on loading phase. The unloading valve deflates the inlet ports to atmosphere during offload conditions and exhaust water, oil, moisture etc from the air dryer. A multi circuit protection valve (MCPV) is used to divide the compressed air system into at least two circuits and to protect the circuits from pressure drops in case of failure. A pressure limiter is used to maximise the pressure in the circuit for trailer/parking. As further options the system may use kinetic energy of the vehicle for instance during negative driveline torque and adapt the regeneration amount of air to the air that have been compressed.

In some embodiments at least parts of two or more solenoid valves 17 are received in the base unit 1. The other parts, or in some embodiments all, of the solenoid valves 17 are received in the electronic drier module 3.

Figure 3:
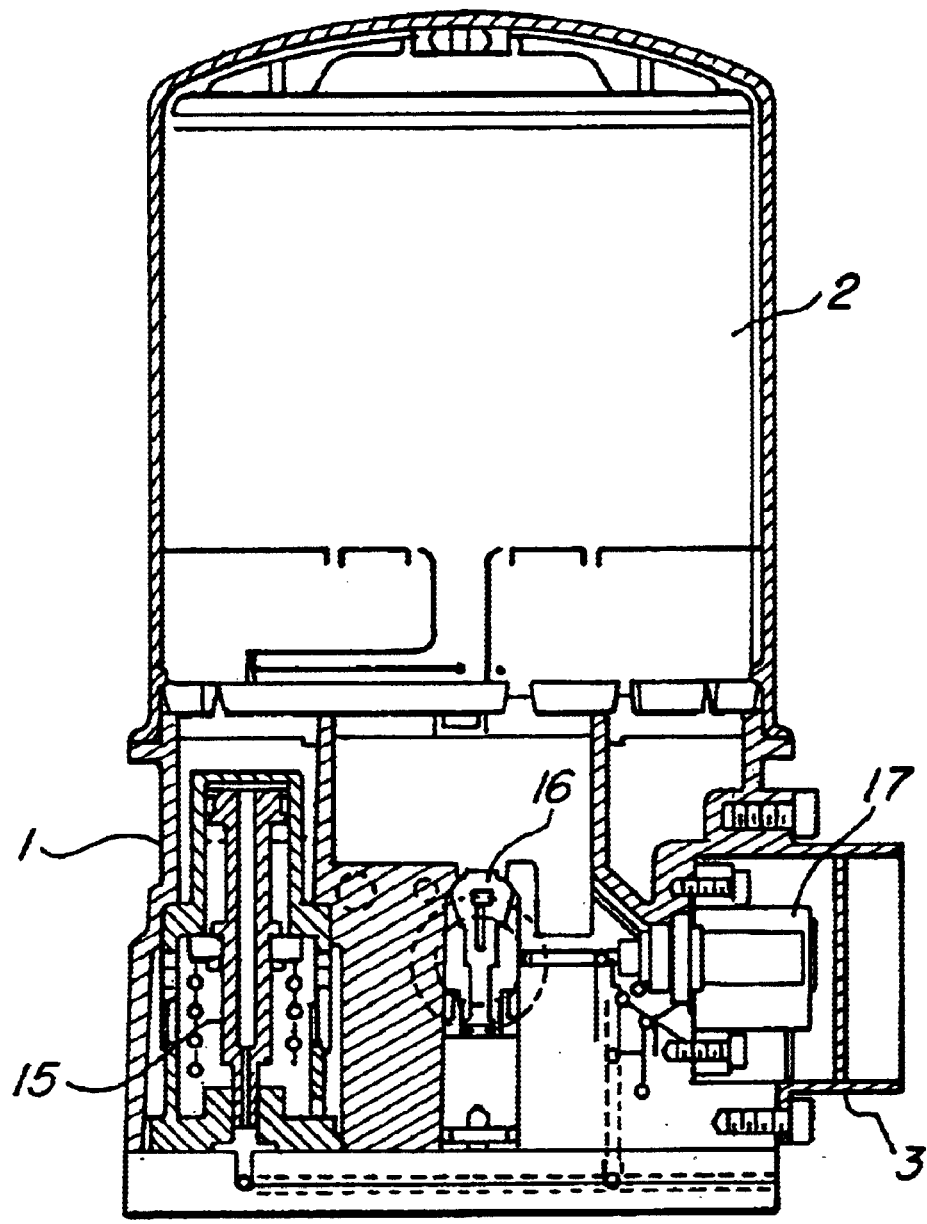
FIG. 3 shows the modular air supply system of FIG. 2 in sectional view.

In FIG. 3 some examples of the optional units received in the base unit 1 are shown. In the view shown an unloading valve 15, an outlet non-return valve 16 and. a solenoid valve 17 are visible. As stated above the base unit 1 normally has a number of further units.

The air treatment module 2 is placed on top of the base unit 1 according to the shown embodiment. The air treatment module 2 has the form of a cartridge including a desiccant. The cartridge may be adapted to the type of vehicle in which it is to be placed, thus, the cartridges differ depending e.g. of type of vehicle and the place of use of the vehicle. In many applications the cartridge is supplemented with a cyclone for coarse separation of oil, water condensate and other contaminants from the compressed air. In some less harsh environments the cyclone may not be needed. The air treatment module 2 is fixed to the base unit 1 by fastening means 7 in the form of screws or other fastening means. The fastening means 7 goes through holes at the corners of a bottom plate 11 of the air treatment module 2 and are received in threaded openings 8 of the base unit 1. In the shown example the openings 8 for receiving the fastening means 7 are arranged at the upper corners of the base unit 1. A person skilled in the art realizes that the air treatment module 2 may be fixed to the base unit 1 in many different ways. In order to facilitate exchange of the module the fastening means should be easily accessible.

The function of the air treatment module 2 is to clean and dry the compressed air before It Is distributed to the air reservoir or the different functions.

The electronic drier module 3 comprises one pressure sensor, one solenoid valve that governs the unloading valve of the base unit 1, one printed circuit board and an air signal outlet. One function of the electronic drier module 3 is to control the regeneration of the desiccant in the cartridge of the air treatment module 2. Optionally the electronic drier module 3 may further comprise one moisture sensor for more efficient regeneration control, a further sensor and solenoid valve 17 that governs a valve on the outlet etc. As stated above one part of each solenoid valve 17 may be received in the base unit 1 and the other part in the electronic drier module 3. In the shown embodiment the electronic drier module 3 is attached to the side of the base unit 1. The electronic drier module 3 is connected to the CAN-bus 14 (Control Area Network) of the vehicle, giving and receiving information regarding ambient temperature, pressure, engine RPM, engine torque, time etc. and provides possible diagnostics.

If a mechanical drier unit is used instead of the electronic drier unit 3 it comprises a mechanical valve that governs the unloading valve. Optionally a mechanical and hydraulic regeneration valve and an inlet check valve are included. The mechanical drier unit is placed in the same location on the base unit 1 as the electronic drier unit 3.

The drier unit, either electronic or mechanic, controls the process of drying and cleaning air from the air compressor before it reaches the different reservoirs or functions. It is also used to control the pressure level in the reservoirs. When the pressure reaches a lower defined pressure limit (cut-in) the air compressor will be started to load the reservoirs through the air drier unit. When the pressure reaches a higher defined pressure limit (cut-out) the unloading valve will open expanding the pressurized air in the drier unit to the atmospheric pressure.

The electronic drier module 3 collects information over the. CAN-bus 14 of the engine speed, engine torque, vehicle speed and ambient temperature. This information is used to make an intelligent loading of the system tanks and regeneration of the desiccant of the air dryer. The electronic drier module 3 may also have a number of optional functions to control and/or monitor. Such optional functions include an electric heater unit, a temperature sensor unit connected with the heater unit, an external filling valve, a condenser separator device for separation of liquid from the compressed air before it reaches the modular air supply system, a moisture sensor etc. As stated above the optional units are normally placed on the base unit 1.

The content of the air distribution module 13 may vary depending on regulations and demands in different countries. Thus, the air distribution module 13 used in the U.S. normally differs from the air distribution module 13 used in the E.U. In the module for the U.S. market e.g. three pressure controlled check valves and one double check valve is enclosed. The module has further four air outlets. One example for an E.U.-module has five air outputs, pressure controlled check valves and pressure limiting valves. The air distribution module 13 is in some embodiments bolted directly on the base unit 1 in connection to and fluid communication with the air outlet 5 of the base unit 1. If the air distribution module 13 is bolted onto the base unit 1, fastening means are normally received in four threaded holes 9 surrounding the air outlet 5. In other embodiments the air distribution module 13 is placed in a remote location but in fluid communication with the air outlet 5 of the base unit 1. The placement of the air distribution module 13 depends in large extent on the available space in the vehicle and a wish to minimize the tubing; it is in many ways an advantage to place the air distribution module close to the reservoirs.

The function of the air distribution module 13 is to distribute the compressed air to the different functions and reservoirs.

1. base unit
2. air treatment module, air drier module
3. electronic drier module
4. air inlet
5. air outlet
6. exhaust
7. screw
8. opening
9. threaded hole
10. bottom plate
11. bottom plate of air treatment module
12. screw
13. air distribution module
14. CAN-bus
15. unloading valve
16. outlet non-return valve
17. solenoid valve

What is claimed is:

1. A modular air supply system for a vehicle, characterized in that it comprises a base unit forming an interface to different modules of the air supply system, an electronic drier module connected to the base unit and that the electronic drier module is connected to a CAN-bus of the vehicle.

2. The modular air supply system of claim 1, characterized in that it comprises an air treatment module connected to the base unit.

3. The modular air system of claim 1, characterized in that it comprises an air distribution module connected to the base unit.

4. The modular air system of claim 1, characterized in that the base unit comprises an air inlet, an air outlet, an exhaust and recesses to receive units having different functions.

5. The modular air system of claim 4, characterized in that the base unit receives an unloading valve, an outlet control valve and/or optional safety valves.

6. The modular air system of claim 4, characterized in that the base unit optionally receives a heater, a silencer, a turbo protection valve and/or a depot valve.

7. The modular air system of claim 6, characterized in that an air treatment module comprises a cartridge for heavy duty, a cartridge for light duty and/or a unit for coarse separation of contaminants from the compressed air.

8. The modular air system of claim 7, characterized in that an air distribution module is bolted onto the base unit.

9. The modular air system of claim 7, characterized in that an air distribution module is placed in a remote location relative the base unit.

10. The modular air system of claim 9, characterized in that the air treatment module is placed on top of the base unit.

11. The modular air system of claim 10, characterized in that the electronic drier module is placed on one side of the base unit.

12. The modular air system of claim 11, characterized in that the air distribution module is placed in communication with the air outlet of the base unit.

13. A modular single tower air supply system for a vehicle, characterized in that it comprises a base unit forming an interface to different modules of the air supply system, an electronic drier module connected to the base unit and that the electronic drier module is connected to a CAN-bus of the vehicle.

14. A modular air supply system for a vehicle, characterized in that it comprises a base unit forming an interface to different modules of the air supply system, an electronic drier module connected to the base unit and that the electronic drier module is controlled by a CAN-bus of the vehicle.

* * * * *